(12) United States Patent
Vesikivi et al.

(10) Patent No.: US 7,389,118 B2
(45) Date of Patent: Jun. 17, 2008

(54) SYSTEM AND METHOD FOR PERSON-TO-PERSON MESSAGING WITH A VALUE-ADDED SERVICE

(75) Inventors: Petri Vesikivi, Espoo (FI); Sakari Kotola, Helsinki (FI)

(73) Assignee: Nokia Corporation, Espoo (FI)

( * ) Notice: Subject to any disclaimer, the term of this patent is extended or adjusted under 35 U.S.C. 154(b) by 562 days.

(21) Appl. No.: 09/896,054

(22) Filed: Jun. 29, 2001

(65) Prior Publication Data

US 2003/0003935 A1 Jan. 2, 2003

(51) Int. Cl.
H04B 7/00 (2006.01)

(52) U.S. Cl. ............... 455/517; 455/445; 455/418; 709/203

(58) Field of Classification Search ............ 455/517, 455/445, 466, 550, 412, 403, 518, 422, 418–420, 455/415; 370/352, 474; 705/14; 709/203, 709/219, 206

See application file for complete search history.

(56) References Cited

U.S. PATENT DOCUMENTS

| | | | |
|---|---|---|---|
| 5,621,729 A | 4/1997 | Johnson et al. | 370/62 |
| 5,893,903 A | 4/1999 | Eisdorfer et al. | 705/1 |
| 6,108,559 A * | 8/2000 | Åstrom et al. | 455/466 |
| 6,112,078 A | 8/2000 | Sormunent et al. | 455/411 |
| 6,289,223 B1* | 9/2001 | Mukherjee et al. | 455/466 |
| 6,321,257 B1* | 11/2001 | Kotola et al. | 709/219 |
| 6,529,939 B1* | 3/2003 | Kraft | 709/203 |
| 6,687,242 B1* | 2/2004 | Enzmann et al. | 370/352 |
| 6,795,711 B1* | 9/2004 | Sivula | 455/466 |
| 7,159,039 B1* | 1/2007 | Hahn et al. | 709/246 |
| 2001/0006889 A1* | 7/2001 | Kraft | 455/412 |
| 2001/0047294 A1* | 11/2001 | Rothschild | 705/14 |
| 2002/0026500 A1* | 2/2002 | Kanefsky et al. | 709/219 |
| 2002/0042815 A1* | 4/2002 | Salzfass et al. | 709/206 |
| 2002/0073235 A1* | 6/2002 | Chen et al. | 709/246 |
| 2002/0078462 A1* | 6/2002 | Foster et al. | 725/87 |
| 2002/0083035 A1* | 6/2002 | Pearl et al. | 707/1 |
| 2002/0144281 A1* | 10/2002 | Taguchi et al. | 725/109 |
| 2002/0147638 A1* | 10/2002 | Banerjee et al. | 705/14 |
| 2002/0152093 A1* | 10/2002 | Chalmers et al. | 705/1 |

(Continued)

FOREIGN PATENT DOCUMENTS

| | | |
|---|---|---|
| EP | 0986275 A1 | 3/2000 |
| EP | 1091607 A2 | 4/2001 |
| WO | WO 98/11744 | 3/1998 |
| WO | WO 99/62011 | 12/1999 |
| WO | WO 00/42747 | 7/2000 |

Primary Examiner—Tan Trinh
(74) Attorney, Agent, or Firm—Morgan & Finnegan, LLP (57) ABSTRACT

A system and method for performing person-to-person messaging with a value added service having a short message service center (SMSC) that receives a message having an address of a terminating wireless device, such as a and a Universal Resource Location (URL); a message server that creates an enhanced message from the address and URL of the message; and a Short Message Service Gateway Mobile Switching Center (SMS GMSC) that forwards the enhanced message to the terminating wireless device. The message server includes a SMSC interface that communicates with the SMSC; an Internet interface that communicates with the Internet; a system bus that connects the SMSC interface and the Internet interface; and a processor, connected to the system bus that extracts the URL and address from the message received via the SMSC interface, retrieves internet content from the Internet located at the URL address, and creates the enhanced message having the retrieved Internet content.

30 Claims, 7 Drawing Sheets

U.S. PATENT DOCUMENTS

2002/0162120 A1* 10/2002 Mitchell .................. 725/135
2002/0178236 A1* 11/2002 Patel et al. ................ 709/218
2002/0184485 A1* 12/2002 Dray et al. ................ 713/150
2003/0017858 A1* 1/2003 Kraft et al. ................ 455/566
2005/0021759 A1* 1/2005 Gupta et al. ............... 709/226
2005/0170855 A1* 8/2005 Comer et al. .............. 455/466

* cited by examiner

SYSTEM AND METHOD FOR PERSON-TO-PERSON MESSAGING WITH A VALUE-ADDED SERVICE

FIELD OF INVENTION

This invention relates to a system and method for wireless communications and in particular to a system and method for person-to-person messaging with a value-added service.

BACKGROUND INFORMATION

The explosive growth of the cell phone industry over the past several years has forced cell phone manufacturers to continually offer new and improved services with each generation of new cell phones. New services such as call waiting, caller ID, three-way calling, call forwarding, and voice dialing have become standard in the newer generation cell phones. In addition, the popularity of the Internet and the ease with which users can obtain and share information over the Internet have created new areas for growth. Given the pervasiveness of the Internet in our everyday lives, it is understandable why there is a great demand to access the Internet via a wireless device such as a cell phone. Many currently available cell phones and other wireless devices are equipped with browser software (often called "microbrowsers") that enables the wireless devices to access hypermedia content on the Internet. However, many earlier generation wireless devices are not equipped with microbrowsers. The lack of a microbrowser restricts the ability of such devices to access hypermedia content on the Internet.

Limited Internet access has been provided to such wireless devices using a service known as Short Message Service ("SMS"), which is available on many such devices. SMS allows users of certain wireless devices to send and receive alphanumeric messages of limited length (e.g., up to 160 characters). SMS is similar to paging, however, SMS does not require that the wireless device be active and within range when a message is sent. If a wireless device is either inactive or out of range, the SMS message generally is held for a period of time until the wireless device either returns to active status or is within range.

SMS-based Internet access is primarily performed by a submission of one or more "keyword" messages from the wireless device to a predetermined address or telephone number serviced by a server. The server prepares an SMS message that includes the information based on the "keyword" and delivers the SMS message back to the requesting wireless device. An example of this type of access would be a request for a stock quote. The wireless user would enter the keyword "QUOTE" followed by the stock symbol. A server would receive the SMS message and the server would have to decode the keyword and attempt to obtain appropriate information requested by the wireless device. Once the quote value was determined, the server would create an SMS message containing the corresponding quote information and forward it to the requesting wireless device.

Wireless devices operate on several different standards throughout the world. The United States, for example, uses a digital cellular system based on a IS-95 and CDMA 2000 standard. Code Division Multiple Access ("CDMA") allows many users to share a common frequency/time channel for transmission by spreading the individual call signals with different codes. Likewise, the European community utilizes a system known as the Global System for Mobile Communications ("GSM"). GSM is based upon a Time Division Multiple Access ("TDMA") and a Frequency Division Multiple Access ("FDMA") standard. Unlike CDMA, each user is given either a temporal or frequency slot to transmit their data. Both CDMA 2000 and the GSM systems utilize separated channels for transmitting data. These channels can be mixed for higher capacity throughput if needed. In addition, the channels can be either traffic channels or control channels.

The SMS messaging service is typically carried on a Standalone Dedicated Control Channel ("SDCCH") in a GSM operating environment. The SDCCH channel operates independently of traffic channels ("TCHs"). Therefore, users of the cell phones may receive SMS messages while simultaneously carrying on a conversation with another user or transmitting data over the TCHs.

The SMS text messaging service handles almost 15 billion character-based messages per month worldwide. Given this enormous popularity, a new and revolutionary way of sending messages was developed that enhanced the already popular SMS. The Multi Media SMS Message ("MMS") service can transmit messages containing text, graphics, photographic images, audio and even video clips between mobile devices using Wireless Application Protocol ("WAP") and powered by new high-speed transmission technologies such as Enhanced Data rate for GSM Evolution ("EDGE") and General Packet Radio Service ("GPRS").

Currently, sending either a SMS or MMS message from one wireless device to another requires an originating wireless device to upload the message and attached content to a central location and then have the central location download the message and attached content to a terminating wireless device. This process has several disadvantages. First, video, image and sound files may be quite large in terms of data, and according to this process, large amounts of data are required to be uploaded and downloaded. This reduces the number of cells that can be carried for a given area. In addition, the above process requires that the originating wireless device store the large data files either in main memory of the cell phone or on a Subscriber Identity Module ("SIM"). Cell phone memory comes at a premium, therefore, storing large amounts of needless data is an inefficient use of memory resources.

The sending of image, sound and video data as well as goods and services (flowers, candy, telephones, etc.) is referred to as value-added services. These value-added services are sent using the SMS and MMS services. Unfortunately, there is no system or method to efficiently handle the transmission of such services.

Accordingly, there remains a need for a system and method for person-to-person messaging with a value-added service that reduces the amount of data transmitted between wireless devices.

SUMMARY OF THE INVENTION

The above-identified problems are solved and a technical advance is achieved in the art by providing a system and method for person-to-person messaging with a value-added service. In a preferred embodiment, the system is comprised of a message server connected to a Short Message Service Center ("SMSC") and the Internet. The SMSC is connected to a SMS Gateway Mobile Switching Center ("SMS GMSC"). The SMSC may also be connected to a database containing Mobile Station ISDN ("MSISDN") information and corresponding advertising information. The SMS GMSC is connected to a Mobile Switching Center ("MSC") which in turn is connected to a Base Station System ("BSS").

In a preferred embodiment, the method for person-to-person messaging with a value-added service entails the production of a SMS or MMS message having Uniform Resource Locators ("URLs") and/or Uniform Resource Identifiers ("URIs"), which are hereinafter referred to interchangeably as URLs. The message also contains a MSISDN that corresponds to the terminating wireless device. The MSISDN is the mobile station ISDN number of the terminating wireless device. The format of the MSISDN varies depending upon country location, but, in the United States, it is typically the country code and a phone number. The URL data refers to the address of a file (resource) accessible on the Internet. The SMS or MMS is forwarded to the BSS, the MSC, and the SMS GMSC. The SMS GMSC forwards the message to the SMSC for processing. There, a message server extracts the enclosed URL, obtains the information via the Internet, creates an enhanced message and forwards the enhanced message to the MSISDN of the terminating MS. The enhanced message includes the data and/or services located at the particular URL. In addition, since the MSISDN of the terminating MS is known, the server can access a database that contains advertising information based upon individual MSISDN numbers, attach the advertising message to the enhanced message, and broadcast the enhanced message to the terminating MS.

BRIEF DESCRIPTION OF THE DRAWINGS

Other aspects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

DETAILED DESCRIPTION OF THE PREFERRED EMBODIMENT

Figure 1:
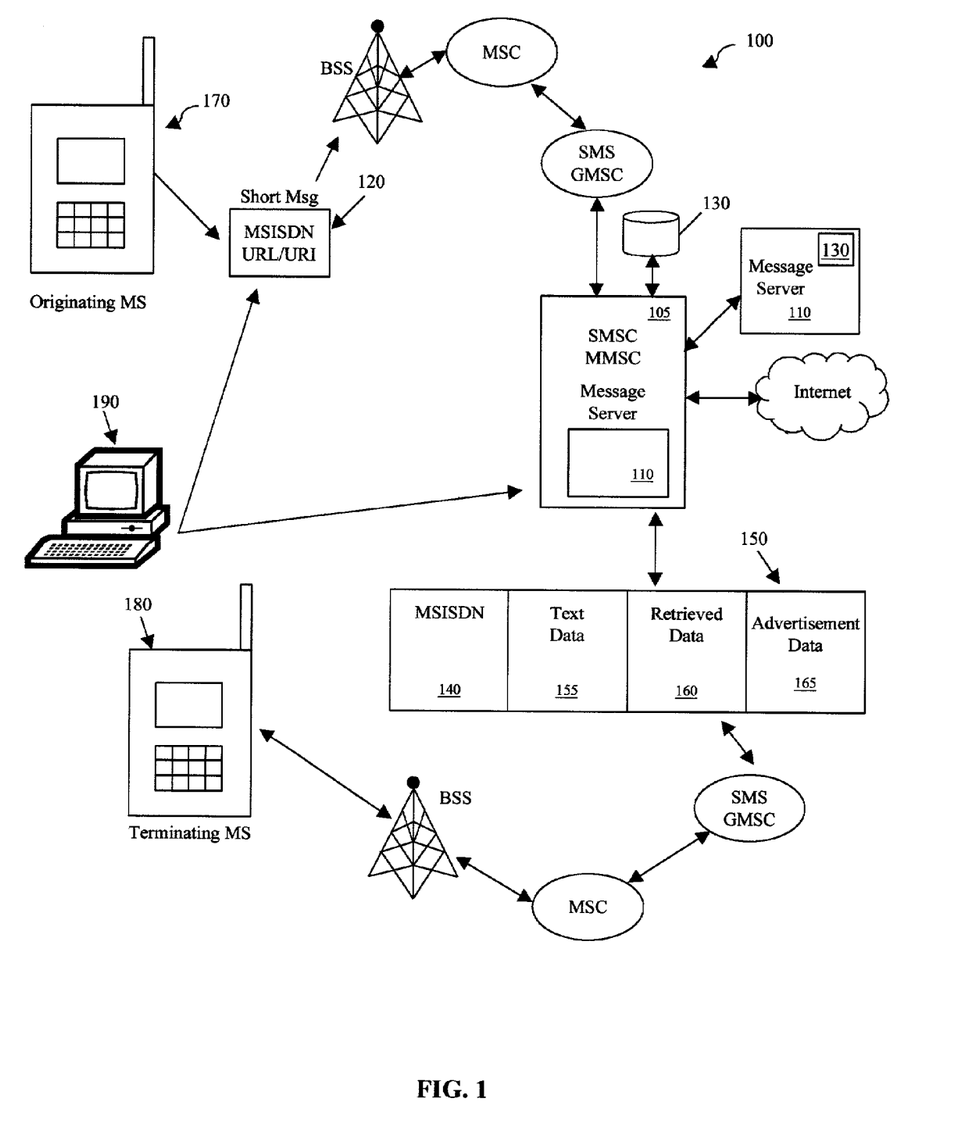
FIG. 1 illustrates a network environment in which a wireless device may be used for person-to-person messaging with a value-added service according to an advantageous embodiment of the present invention.

Referring now to the drawings, in which similar reference characters denote similar or identical elements throughout the several views, FIG. 1 illustrates a network environment in which a wireless device may be used for person-to-person messaging with a value-added service according to one embodiment of the present invention. The system 100 is comprised of an originating mobile station 170 and a terminating mobile station 180. Originating mobile station 170 generates a short message 120 that is wirelessly transmitted to a Base Station System ("BSS") using the Global System for Mobile Communications ("GSM") network. The short message 120 is received via a Mobile Switching Center ("MSC") and is forwarded to a SMS GMSC gateway mobile switching center. The SMSC receives short message 120 from the SMS GMSC and processes it using a message server 110. The message server in a preferred embodiment of the present invention is connected to the SMSC. However, in an equally functional alternate embodiment, the message server 110 may be run as a software application or separate hardware on the SMSC. In addition, it is understood that the present invention may be incorporated into other standards having SMS-like services.

As shown in FIG. 1, short message 120 contains a message header and a message body. The message header may contain address information identifying where the message should be sent. The message body contains a MSISDN number of a terminating MS and URL data in the body of short message 120. The header contains the address information directing the short message to the SMSC. The MSISDN refers to the ISDN number of the terminating wireless device. The URL refers to the address of the data (resource) accessible on the Internet. Message server 110 is connected to the Internet through a high-speed connection. Message server 110 extracts the URL from short message 120, accesses the Internet and obtains the Internet content located at the URL. Message server 110 then creates an enhanced message 150 that is comprised of a retrieved data field 160 containing the retrieved data and a MSISDN field. In addition, enhanced message 150 may contain a text data field 155 and an advertisement data field 165.

Short message 120 contains the MSISDN number of the terminating MS 180. It is therefore possible to send an advertisement to terminating MS 180. In addition, since the identity of the terminating MS is known, an advertising database 130, connected to server 110, can provide advertisements that are tailored to the personal interests of MS 180. Message server 110 can access advertisement database 130, match the MSISDN with one of a plurality of records in the database 130, and attach advertisement data to advertisement data field 165 of the enhanced message 150. The enhanced message 150 is then forwarded by SMSC 105 to the terminating MS 180 via SMS GMSC, MSC and BSS.

Sending a short message 120 in this manner reduces the amount of air interface traffic and bandwidth requirements because originating MS 170 is not required to download the information located at the URL location contained in short message 120. Therefore, short message 120 contains a minimal amount of data thereby reducing the amount of air interface traffic and bandwidth resources required to transmit the short message 120. Message server 110 is connected to the Internet using a high speed Internet backbone and therefore efficiently retrieves the information requested. The information retrieved by message server 110 may be any type of data including but not limited to video data, image data, text data, audio data, and/or goods/services. The retrieved data 160 along with optional text data 155 and optional advertisement data 165 is broadcast to the terminating MS 180 and thereby reduces the amount of air interface usage and bandwidth resources required by almost fifty percent.

While this embodiment has been described using an originating MS 170, it is understood that a personal computer 190 may also create and forward a short message 120 either wirelessly through BSS or directly to the SMSC 105. In addition, it is understood that SMSC 105 may also be a MMSC. These two terms may be used interchangeably throughout this application.

Figure 2:
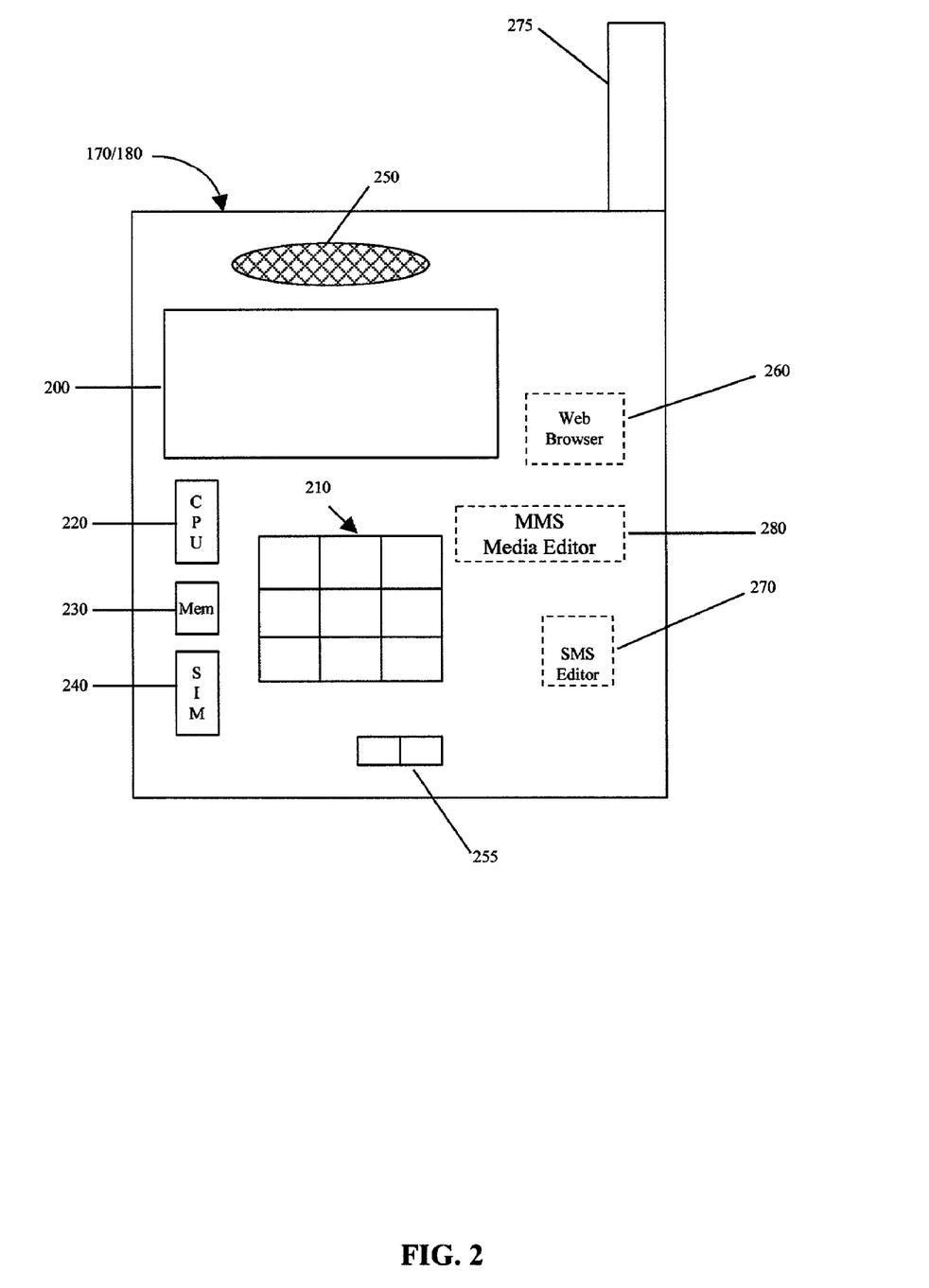
FIG. 2 is a block diagram of a wireless device for use with the network of FIG. 1.

Turning now to FIG. 2, there is shown a block diagram of an exemplary wireless device for use with an embodiment of the present invention. The wireless device of FIG. 2 may be either or both the originating MS 170 and the terminating MS 180. The wireless device is comprised of a display 200, a plurality of keys 210, and a central processing unit 220. In addition, the wireless device may contain a memory 230 and a Subscriber Identity Module ("SIM"). Memory 230 and SIM 240 provide temporary storage for CPU 220. A speaker 250, a microphone 255, and an antenna 275 are also provided in the wireless device. The wireless device of FIG. 2 is equipped with a web browser 260 for viewing hypertext media content from the Internet, a SMS editor 270 for creating short message 120, and a media editor 280 for creating, displaying and editing MMS messages.

Figure 3:
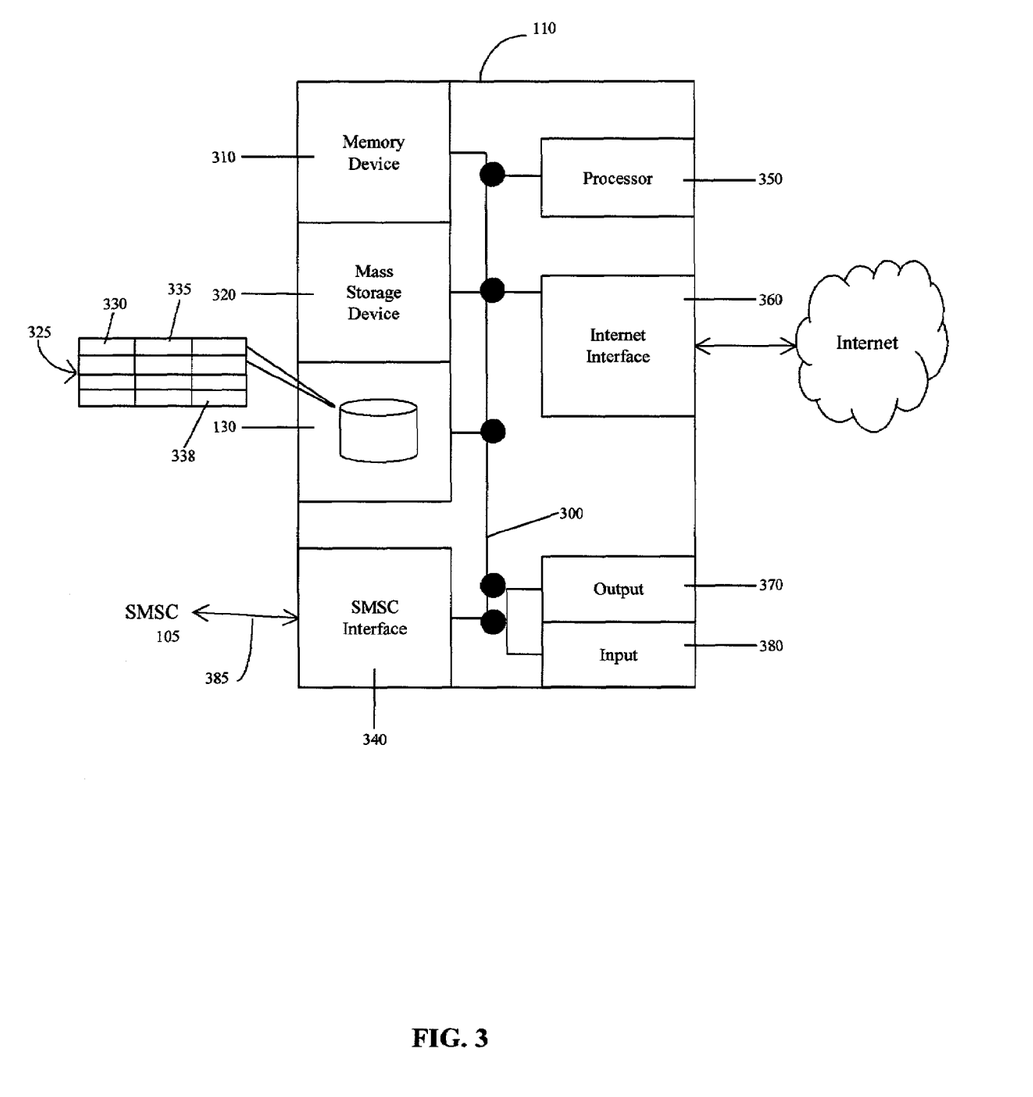
FIG. 3 is a block diagram of a message server in FIG. 1.

FIG. 3 is a block diagram of an exemplary message server of FIG. 1. Message server 110 is comprised of a processor 350, a SMSC interface 340, and an Internet interface 360 interconnected via a system bus 300. The SMSC interface 340 is connected to SMSC 105 via an SMSC link 385. In addition, an input device 380 and an output device 370 provide input and output data capabilities. Internet interface 360 is connected to the Internet via a high-speed backbone.

Processor 350 obtains short message 120 from SMSC 105 via SMSC interface 340 and the system bus 300. The URL and MSISDN are extracted from short message 120 by the processor 350. The URL is utilized by Internet interface 360 to obtain the information designated by the URL from the Internet. This information is then stored in a memory 310 or a mass storage device 320, which is connected to system bus 300. After the information is retrieved, processor 350 creates enhanced message 150 and stores the retrieved data in retrieved data field 160. The extracted MSISDN information is stored in MSISDN field 140 of enhanced message 150. This enhanced message 150 may then be forwarded to terminating MS 180 via SMS GMSC, the MSC, and the base station subsystem.

Processor 350 may also add advertising data to enhanced message 150 prior to sending enhanced message 150 to the SMS GMSC. The process of attaching advertisement information to the enhanced message 150 is accomplished by comparing the MSISDN data from short message 120 with a plurality of records 325 located within advertisement database 130. The plurality of records of advertisement database 130 each include a MSISDN data field 330, and a preference data field 335 that contains advertising relating to an area of interest for the corresponding MSISDN. Records 325 may also contain a shipping address field 338 containing a shipping address relating to the terminating wireless device. Once a successful match is made of the MSISDN, the accompanying advertisements stored in the preference data field of a matching record of advertisement database 130 are stored in the advertisement field 165 of enhanced message 150.

In this manner, it is possible to provide advertisements that are tailored to the personal preference of the terminating MS 180. For example, if terminating MS 180 indicates that the user's interests include shopping, camping and sports, the preference data field may contain brief messages directed to these interests. It is understood that the preference data field may contain a plurality of records each containing individual advertisement messages.

Figure 4:
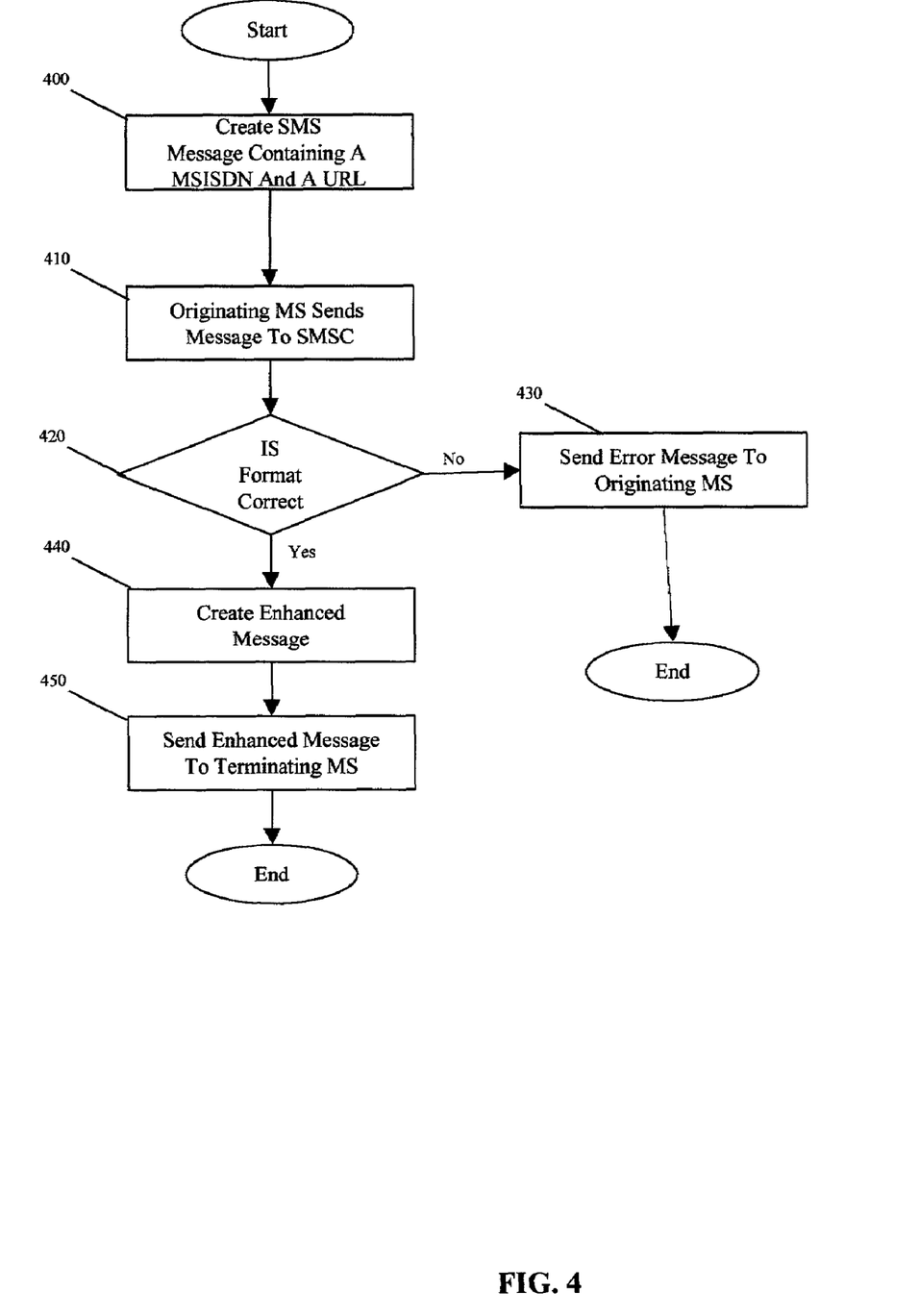
FIG. 4 is a flow diagram of a method for person-to-person messaging with a value-added service according to an advantageous embodiment of the present invention.

FIG. 4 illustrates a flow diagram of an exemplary method for person-to-person messaging with a value-added service according to an embodiment of the present invention. Step 400 creates SMS message 120 containing a MSISDN and a URL in the body of the message. Originating MS 170 then sends short message 120 to SMSC in step 410. Step 420 determines whether or not the format of the short message 120 is correct. For example, the URL address should contain certain characters such as "www" identifying the World Wide Web, and an appropriate suffix such as .com, .org, .edu, .gov, etc. If the address is correct, step 440 creates an enhanced message 150 using the information contained in short message 120 and step 450 sends the enhanced message 150 to terminating MS 180. If step 420 determines that the format is not correct, step 430 sends an error message to the originating MS 170 indicating what is wrong with the format and ends the procedure.

Figure 5:
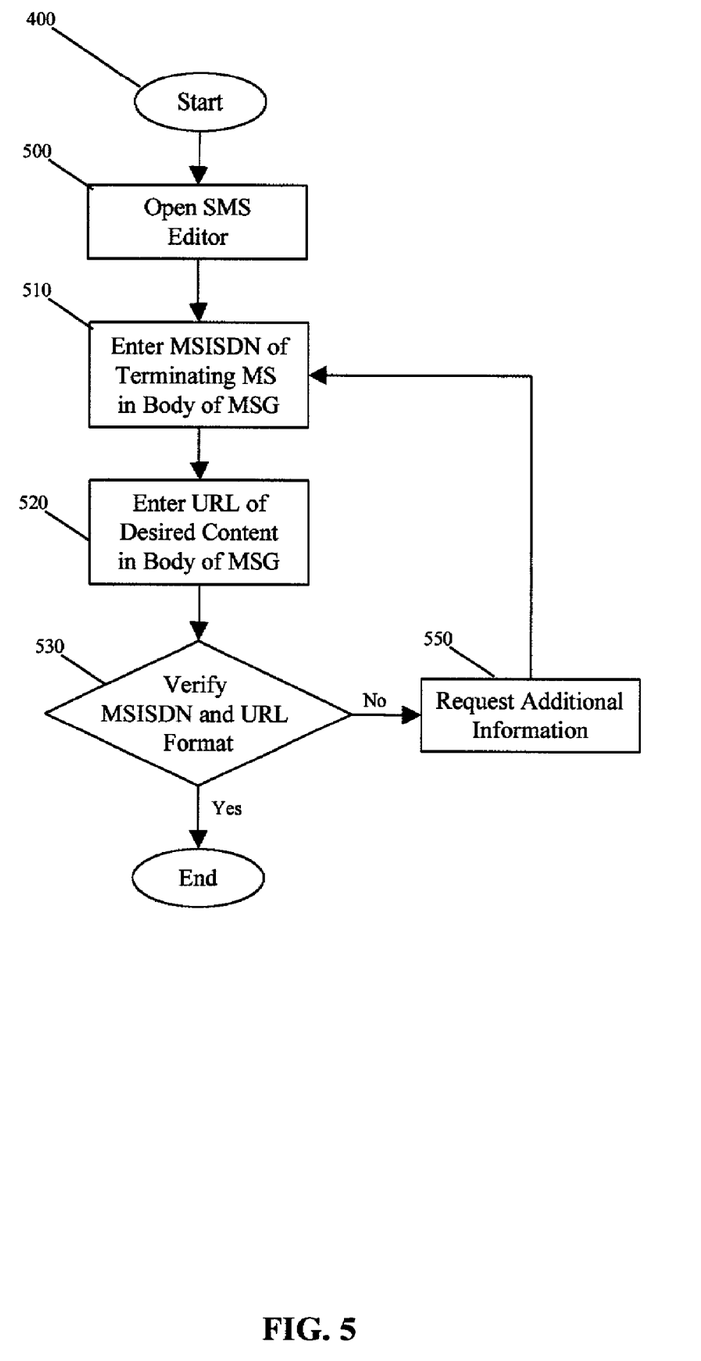
FIG. 5 is a flow diagram illustrating the method for creating a SMS message according to FIG. 4.

FIG. 5 illustrates a flow diagram for creating SMS message according to FIG. 4. Step 500 opens SMS editor 270 while step 510 prompts the user of originating MS 170 to enter the MSISDN of terminating MS 180 in the body of the short message 120. The MSISDN is the ISDN number of the MS. For GSM systems deployed in Europe and Asia, the MSISDN consists of a country code ("CC"), national designation code ("NDC"), and subscriber number ("SN"). The SN is the address to the serving MSC. For systems in the United States, the MSISDN number follows the North American Number Plan ("NANP") format. The NANP format consists of the CC, a three-digit number planning area ("NPA") code plus a seven-digit SN code.

Step 520 prompts the user to enter a URL pointing to the desired content on the Internet into the body of short message 120. Step 530 determines whether the MSISDN and URL information is in an acceptable format. If not, step 550 requests additional information and returns to step 510 to prompt the user to enter a corrected MSISDN or corrected URL. If step 530 determines that the format is correct, the procedure ends.

Figure 6:
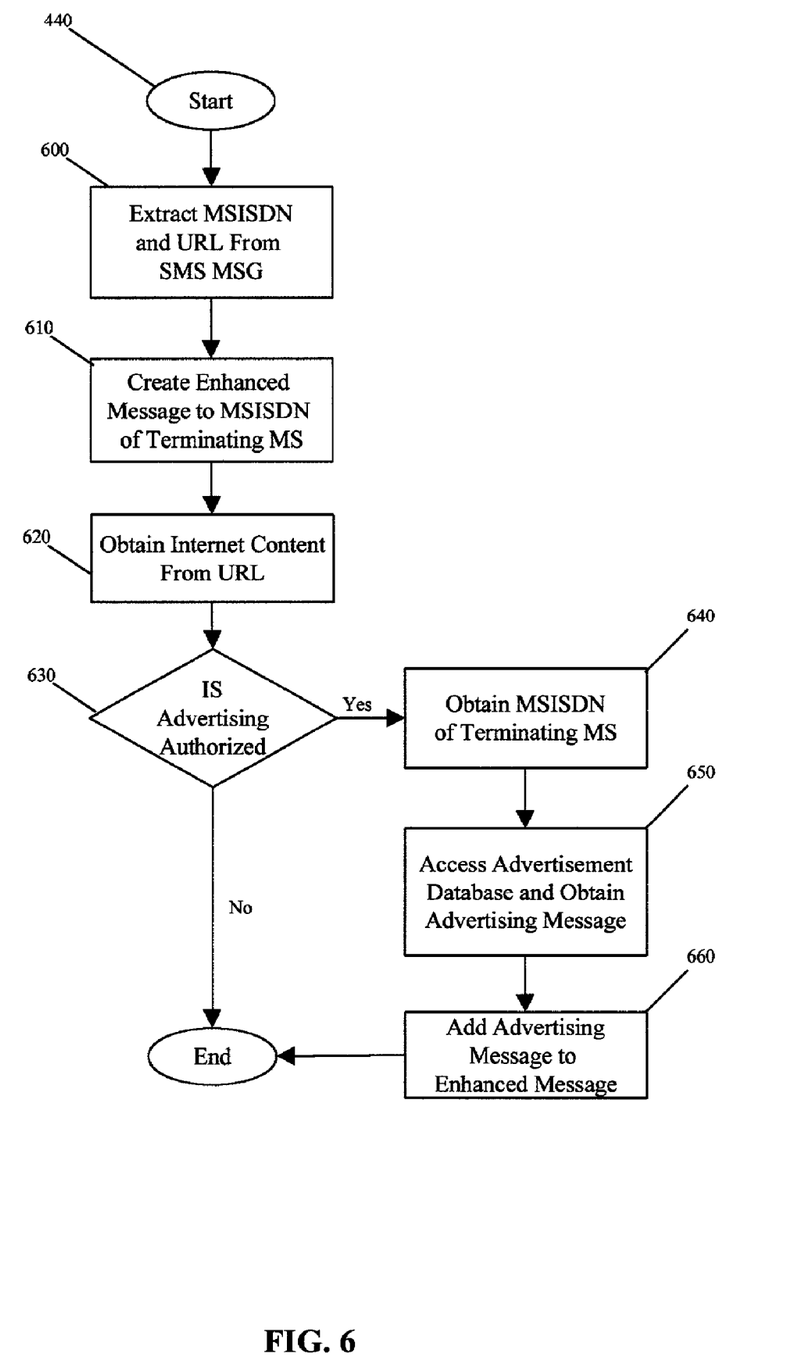
FIG. 6 is a flow diagram illustrating the method for creating an enhanced message according to FIG. 4.

FIG. 6 is a flow diagram illustrating an exemplary method for creating an enhanced message by the message server according to FIG. 4. Step 600 extracts the MSISDN and URL information from the SMS short message 120. Step 610 then creates the enhanced message and addresses it to the MSISDN of the terminating MS 180. Step 620 obtains the Internet content pointed to by the URL contained in the short message 120. This retrieved content may be stored in memory device 310 attached to the message server 110 or in mass storage device 320. Step 630 determines whether or not the addition of advertising is authorized. If not, the procedure ends. If advertising is authorized, step 640 obtains the MSISDN of the terminating MS 180 from short message 120. Step 650 accesses advertisement database 130 and obtains an appropriate advertising message from the preference data field corresponding to the MSISDN of the terminating MS 180. Step 660 then adds the advertising message to the enhanced message 150 in advertising field 165 and the procedure ends. During the course of the relationship between the cellular service provider and the wireless device user, certain information is requested and or obtained that identifies various likes and dislikes of the wireless user. For example, shopping records of the user may indicate that the user is a frequent purchaser of sports equipment or accesses financial information on a regular basis. Accordingly, the advertisement database 130 stores advertisement massages that are directed to those interests in the preference data field of the corresponding MSISDN.

Figure 7:
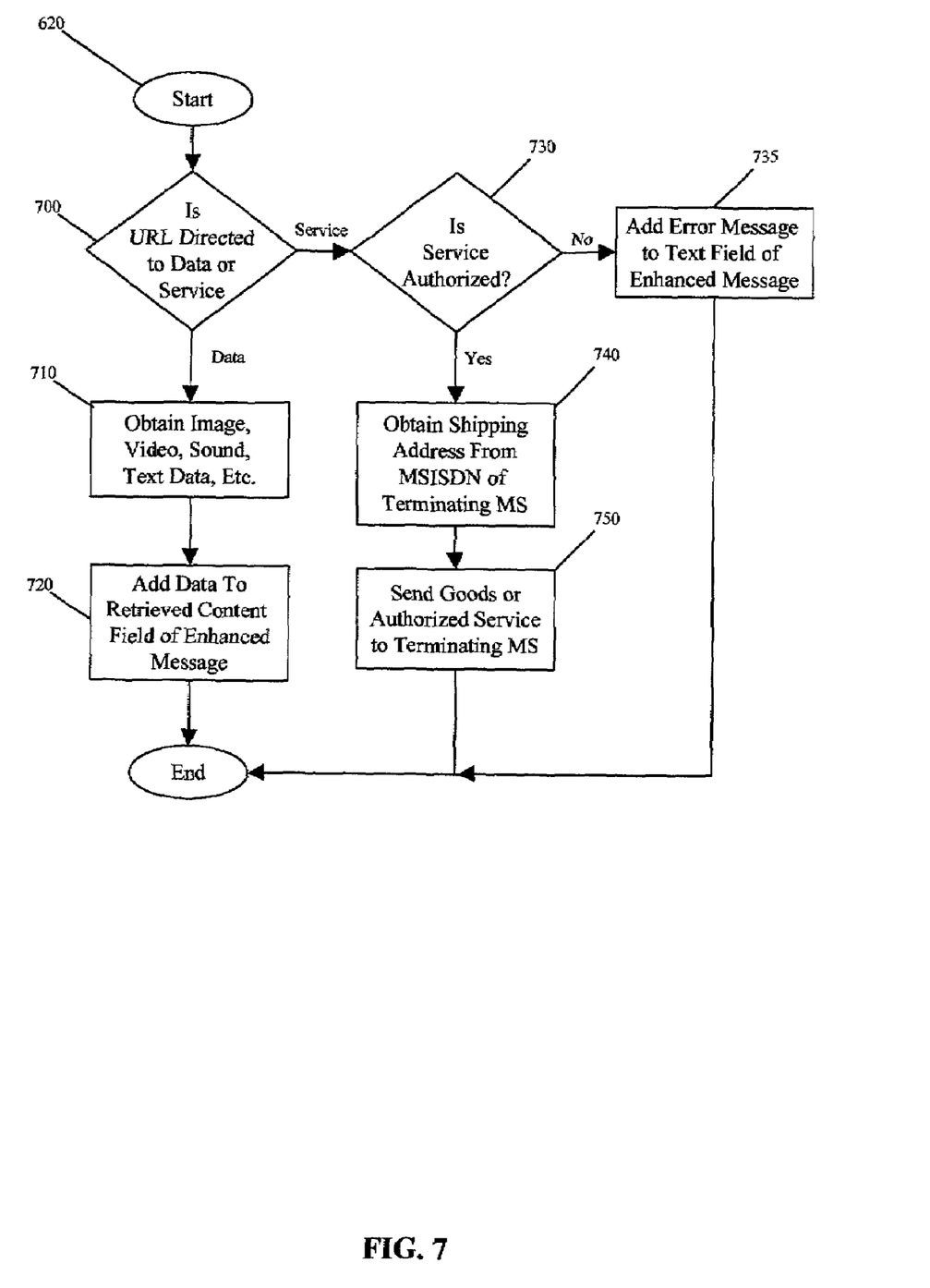
FIG. 7 is a flow diagram illustrating the method for obtaining content from a URL according to FIG. 6.

FIG. 7 is a flow diagram illustrating an exemplary method for obtaining content from a URL according to FIG. 6. Step 700 determines whether or not the URL is directed to a service or data. If the URL is directed to data, such as voice data, video data, sound data, or text data, step 710 then retrieves the appropriate data. Step 720 then adds the retrieved data to the retrieved content field 160 of enhanced message 150 and the procedure ends. If step 700 determines that the URL is directed to a service, step 730 determines whether or not the service is authorized. If the service has not been authorized, step 735 adds an error message to text field 155 of enhanced message 150.

If step 730 determines that the service is authorized, step 740 then obtains shipping address information 338 from the MSISDN of the terminating MS 180. This shipping address information 338 may be stored in database 130. Once a shipping address information is obtained in step 740, step 750 sends the goods or authorized services to the shipping address of terminating MS 180 and the procedure ends. Where the service request is one that is used by the terminating MS 180, shipping address is not required. For example, if a gift of additional paid airtime or an enhanced wireless feature such as call forwarding is paid for as a gift by the originating MS 170, the service may be broadcast to the terminating MS 180 without the need for a shipping address. In this example, server generates and sends an authorization code that enables the terminating device 180 to perform the paid for additional service. The authorization code may be stored in the SIM of the terminating SM.

Although the description above contains many specifics, these are merely provided to illustrate the invention and should not be construed of limitations of the invention scope. Thus, it will become apparent to those skilled in the art that various modifications and variations can be made in the systems and methods of the present invention without departing from the spirit or scope of the invention. Accordingly, it is intended that the present invention covers its modifications and variations provided they come within the scope of the appended claims and their equivalents. In this context, "equivalents" means each and every implementation for carrying out the functions in the claims, even if not explicitly described herein.

What is claimed:

1. A system for performing person-to-person messaging with a value added service comprising:
    a message service center that receives a message from an originating wireless device, the message having an address of a terminating wireless device and a Universal Resource Locator;
    a message server that retrieves Internet content located at the Universal Resource Locator, creates an enhanced message from the address of the wireless device and Universal Resource Locator of the message, and stores the retrieved Internet content in the enhanced message; and
    a Message Service Gateway Mobile Switching Center that forwards the enhanced message to the terminating wireless device.

2. The system according to claim 1 wherein the message service center is a Short Message Service Center, the message is a short message, and the Message Service Gateway Mobile Switching Center is a Short Message Service Gateway Mobile Switching Center.

3. The system according to claim 1 wherein the address of the terminating wireless device is a Mobile Station Integrated Service Digital Network number.

4. The system according to claim 1 further comprising a personal computer that creates the message and forwards the message to the message service center.

5. The system according to claim 1 further comprising a wireless device having a Short Message Service editor that creates the message and a media editor that views the enhanced message.

6. The system according to claim 1 wherein the message contains a message header and a message body, the message body containing the address and Universal Resource Locator data.

7. The system according to claim 1 further comprising an advertising database, the database having a plurality of records, each record having an address data field and a preference data field, wherein the preference data field contains advertising data relating to an area of interest for the corresponding address.

8. The system according to claim 7 wherein the enhanced message contains an advertising field, wherein the address included in the received message is matched with a corresponding record in the advertising database, advertising data is extracted from the preference data field, and the advertising data is stored in the advertising field of the enhanced message.

9. A system for performing person-to-person messaging with a value added service comprising:
    a message service center that receives a message having an address of a terminating wireless device and a Universal Resource Locator;
    a message server that creates an enhanced message from the address of the wireless device and Universal Resource Locator of the message; and
    a Message Service Gateway Mobile Switching Center that forwards the enhanced message to the terminating wireless device
    wherein the message service center is a Short Message Service Center, the message is a short message, and the Message Service Gateway Mobile Switching Center is a Short Message Service Gateway Mobile Switching Center
    wherein the message server comprises:
    a Short Message Service Center interface that communicates with the Short Message Service Center;
    an Internet interface that communicates with the Internet;
    a system bus that connects the Short Message Service Center interface and the Internet interface; and
    a processor, connected to the system bus that extracts the Universal Resource Locator and address from the short message received via the Short Message Service Center interface, retrieves internet content from the Internet via the Internet interface located at the Universal Resource Locator address, and creates the enhanced message having the retrieved Internet content.

10. The system according to claim 9, wherein the enhanced message comprises:
    an address field; and
    a retrieved content field, wherein the processor stores the terminating address from the short message into the address field and stores the retrieved Internet content into the retrieved content field.

11. The system according to claim 9, further comprising a memory device connected to the system bus that temporarily stores data, wherein the processor stores the retrieved Internet content in the memory device.

12. The system according to claim 9 further comprising an advertising database connected to the system bus, the database having a plurality of records, each record having an address data field and a preference data field, wherein the preference data field contains advertising data relating to an area of interest for the corresponding address.

13. The system according to claim 12 wherein the enhanced message contains an advertising field, wherein the processor matches the address included in the short message with a corresponding record in the advertising database, extracts advertising data from the preference data field and stores the advertising data in the advertising field of the enhanced message.

14. The system according to claim 9, wherein the Internet content is directed to data selected from the group consisting of: video data, sound data, image data and text data.

15. The system according to claim 9 wherein the Internet content is directed to a good/service, wherein the processor obtains a shipping address associated with the terminating address and forwards the good/service to the shipping address.

16. The system according to claim 9 wherein the Internet content is directed to a good/service wherein the processor generated an authorization code that allows the terminating wireless device to utilize the good/service.

17. A method for performing person-to-person messaging with a value-added service comprising:
 receiving a message having an address of a terminating wireless device and a Universal Resource Locator address;
 retrieving Internet content located at the Universal Resource Locator address;
 creating an enhanced message and storing the retrieved Internet content in the enhanced message;
 sending the enhanced message to the terminating wireless device;
 determining whether the Internet content located at the Universal Resource Locator address is data content or goods/services content;
 generating an authorization code if the Universal Resource Locator address refers to goods/services content; and
 storing the authorization code in a retrieved content field of the enhanced message.

18. The method according to claim 17 wherein the address of the terminating wireless device is a Mobile Station Integrated Service Digital Network number.

19. The method according to claim 17 wherein the step of creating further comprises:
 accessing an advertisement database containing a plurality of records, each record having an address field and preference data field, the preference data field containing advertisement data;
 matching the terminating address with a corresponding record of the advertisement database;
 retrieving the corresponding advertisement data; and
 storing advertisement data in an advertisement field of the enhanced message.

20. The method according to claim 17 wherein the step of retrieving further comprises:
 determining whether the Universal Resource Locator address is a valid address;
 creating an error message if the Universal Resource Locator address is invalid; and
 storing the error message in a text field of the enhanced message.

21. The method according to claim 17 further comprising:
 determining whether the Internet content located at the Universal Resource Locator address is data content or goods/services content;
 retrieving the data content and storing the content in a memory device if the Universal Resource Locator address refers to data content; and
 storing the retrieved data in a retrieved content field of the enhanced message.

22. The method according to claim 17 further comprising:
 determining whether the Internet content located at the Universal Resource Locator address is data content or goods/services content;
 obtaining a shipping address of the terminating wireless device if the Universal Resource Locator address refers to goods/services content; and
 forwarding the goods/services to the shipping address of the terminating wireless device.

23. A system for performing person-to-person messaging with a value-added service comprising:
 means for receiving a message having an address of a terminating wireless device and a Universal Resource Locator address;
 means for retrieving Internet content located at the Universal Resource Locator address;
 means for creating an enhanced message and storing the retrieved Internet content in the enhanced message;
 means for sending the enhanced message to the terminating wireless device;
 means for determining whether the Internet content located at the Universal Resource Locator address is data content or goods/services content;
 means for generating an authorization code if the Universal Resource Locator address refers to goods/services content; and
 means for storing the authorization code in a retrieved content field of the enhanced message.

24. The system according to claim 23 wherein the means for creating further comprises:
 means for accessing an advertisement database containing a plurality of records, each record having an address field and preference data field, the preference data field containing advertisement data;
 means for matching the terminating address with a corresponding record of the advertisement database;
 means for retrieving the corresponding advertisement data; and
 means for storing advertisement data in an advertisement field of the enhanced message.

25. The system according to claim 23 further comprising:
 means for determining whether the Internet content located at the Universal Resource Locator address is data content or goods/services content;
 means for retrieving the data content and storing the content in a memory device if the Universal Resource Locator address refers to data content; and
 means for storing the retrieved data in a retrieved content field of the enhanced message.

26. The system according to claim 23 further comprising:
 means for determining whether the Internet content located at the Universal Resource Locator address is data content or goods/services content;
 means for obtaining a shipping address of the terminating wireless device if the Universal Resource Locator address refers to goods/services content; and
 means for forwarding the goods/services to the shipping address of the terminating wireless device.

27. A server, comprising:
 a memory having program code stored therein; and
 a processor disposed in communication with the memory for carrying out instructions in accordance with the stored program code;
 wherein the program code, when executed by the processor, causes the processor to perform:
  receiving a message from an originating wireless device, the message having an address of a terminating wireless device and a Universal Resource Locator address;
  retrieving Internet content located at the Universal Resource Locator address; and
  creating an enhanced message and storing the retrieved Internet content in the enhanced message,
  wherein the enhanced message is sent to the terminating wireless device.

28. The server according to claim 27 further comprising an advertising database disposed in communication with the processor, the database having a plurality of records, each record having an address data field and a preference data field, wherein the preference data field contains advertising data relating to an area of interest for the corresponding address.

29. The server according to claim 28 wherein the enhanced message contains an advertising field, wherein the processor matches the terminating wireless device address included in the received message with a corresponding record in the advertising database, extracts advertising data from the preference data field and stores the advertising data in the advertising field of the enhanced message.

30. An article of manufacture comprising a computer readable medium containing program code that when executed causes an apparatus to perform:

receiving a message from an originating wireless device, the message having an address of a terminating wireless device and a Universal Resource Locator address;

retrieving Internet content located at the Universal Resource Locator address; and creating an enhanced message and storing the retrieved Internet content in the enhanced message, wherein the enhanced message is sent to the terminating wireless device.

* * * * *